US009828945B2

United States Patent
Russ et al.

(10) Patent No.: US 9,828,945 B2
(45) Date of Patent: Nov. 28, 2017

(54) RAM AIR TURBINE DRIVESHAFT GEAR AND BEARING ARRANGEMENT

(71) Applicant: HAMILTON SUNDSTRAND CORPORATION, Charlotte, NC (US)

(72) Inventors: David Russ, Rockford, IL (US); Stephen Bortoli, Roscoe, IL (US); Richard Schultz, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 642 days.

(21) Appl. No.: 14/280,592

(22) Filed: May 17, 2014

(65) Prior Publication Data
US 2015/0330331 A1    Nov. 19, 2015

(51) Int. Cl.
| | |
|---|---|
| *F01D 15/12* | (2006.01) |
| *F02K 7/16* | (2006.01) |
| *F16H 1/14* | (2006.01) |
| *F01D 25/00* | (2006.01) |
| *B64D 41/00* | (2006.01) |
| *F03D 9/00* | (2016.01) |

(52) U.S. Cl.
CPC ............. *F02K 7/16* (2013.01); *B64D 41/007* (2013.01); *F01D 25/005* (2013.01); *F03D 9/00* (2013.01); *F16H 1/14* (2013.01); *F05B 2220/31* (2013.01); *F05B 2240/50* (2013.01); *F05B 2240/61* (2013.01); *F05B 2260/4031* (2013.01); *F05B 2260/5032* (2013.01); *F05B 2260/96* (2013.01); *Y02E 10/72* (2013.01)

(58) Field of Classification Search
CPC . F03D 9/00; F02K 7/16; B64D 41/007; F01D 25/005; F16H 1/14; Y02E 10/72; Y10T 29/4932; Y10T 29/49826; Y10T 29/49316; F02C 7/32; F02C 7/36; F16C 25/083
USPC ................... 416/170 R; 29/428, 889.2, 889; 415/124.1
See application file for complete search history.

(56) References Cited

U.S. PATENT DOCUMENTS

| | | | | |
|---|---|---|---|---|
| 3,774,466 A | * | 11/1973 | Bhatia | ........................ F16H 1/14 74/417 |
| 4,742,976 A | * | 5/1988 | Cohen | .................. B64D 41/007 244/58 |

(Continued)

OTHER PUBLICATIONS

Extended European Search Report dated Oct. 5, 2015 in European Application No. 15001481.9.

*Primary Examiner* — Jason Shanske
*Assistant Examiner* — Kelsey Stanek
(74) *Attorney, Agent, or Firm* — Snell & Wilmer L.L.P.

(57) ABSTRACT

A ram air turbine is presented that includes a turbine having a blade and a turbine shaft, a strut removably coupled to the turbine, wherein the strut has a gearbox section and a drive section, a turbine shaft with a bevel gear oriented perpendicularly to the turbine shaft and positioned within the gearbox section of the strut, a driveshaft coupled to the generator and positioned within the drive section of the strut, and a pinion gear that engages with the bevel gear, wherein the pinion gear is secured to the driveshaft by a spanner nut, wherein the pinion gear utilizes a key configured to interact with the keyed joint of the driveshaft. The pinion gear is supported by a pinion bearing that may be press fit onto the pinion gear and by one of the generator bearings.

15 Claims, 5 Drawing Sheets

(56) References Cited

U.S. PATENT DOCUMENTS

| | | | | |
|---|---|---|---|---|
| 2002/0170768 A1* | 11/2002 | Izumi | ............... | B60K 17/00 |
| | | | | 180/374 |
| 2012/0128495 A1* | 5/2012 | Bortoli | ............... | B64D 41/007 |
| | | | | 416/170 R |
| 2012/0269634 A1* | 10/2012 | Bortoli | ............... | F03D 9/00 |
| | | | | 416/170 R |
| 2013/0259648 A1* | 10/2013 | Russ | ............... | F16H 57/0443 |
| | | | | 415/122.1 |

* cited by examiner

RAM AIR TURBINE DRIVESHAFT GEAR AND BEARING ARRANGEMENT

FIELD

The present disclosure relates to components of ram air turbines, and more particularly, to driveshaft and pinion gear arrangements of ram air turbines.

BACKGROUND

Ram air turbines are generally used in aircraft to provide supplemental and/or emergency power to the aircraft by utilizing air flow to rotate a turbine. Ram air turbines can provide either electrical or hydraulic power. Electrical ram air turbines produce electrical power by transferring the rotation of the turbine to a generator. Ram air turbines can comprise a strut and gearbox design that includes a pinion and pinion bearing arrangement. The gear plating process in traditional designs can be costly. In addition, each individual bearing required adds significant additional cost. Therefore, eliminating individual bearings and/or reducing the need for plating of gears may be beneficial.

SUMMARY

A ram air turbine may comprise a turbine comprising a blade and a turbine shaft, a strut removably coupled to the turbine, wherein the strut comprises a gearbox section, a drive section, and a generator adapter section, a turbine shaft comprising a bevel gear oriented perpendicularly to the turbine shaft and positioned within the gearbox section of the strut, a driveshaft positioned within the drive section of the strut and comprising a keyed joint, wherein the driveshaft is removably coupled to a generator, a pinion gear that engages with the bevel gear and is secured to the driveshaft, and a pinion bearing coupled to the pinion gear, wherein the driveshaft is supported on an end by the pinion gear bearing and is supported on another end by a generator bearing assembly located within the generator adapter section. The pinion gear may be secured to the driveshaft by a spanner nut, and the pinion gear may comprise a key configured to interact with the keyed joint of the driveshaft. A pinion bearing may be coupled to pinion gear. The pinion bearing may be press fit onto the pinion gear. The driveshaft may comprise stainless steel. The pinion gear may comprise an uncoated metal material. The pinion bearing retainer may be engaged with the strut assembly by a threaded engagement.

A ram air turbine may comprise a turbine comprising a blade, a strut removably coupled to the turbine, wherein the strut comprises a gearbox section and a drive section, a turbine shaft comprising a bevel gear oriented perpendicularly to the turbine shaft and positioned within the gearbox section of the strut, a generator having a bearing and a joint for receiving a splined shaft, a driveshaft positioned within the drive section and comprising an end removably coupled to the generator, wherein the end comprises a spline that is complimentary to the joint of the generator, and a pinion gear that engages with the bevel gear, wherein the pinion gear is secured to the driveshaft and is supported by a bearing in the gearbox section and a bearing in the generator. A shaft bending frequency of the driveshaft is greater than an operating range frequency of the turbine. The drivetrain may comprise the turbine, turbine shaft, and driveshaft, and generator, and a frequency of rotation of the drivetrain is greater than one revolution per revolution of the turbine. The driveshaft may be hollow or solid. An inner diameter of the driveshaft and an outer diameter of a driveshaft may be chosen such that a torsional natural frequency of the drivetrain is less than an operating range frequency of the turbine. The gearbox section may further comprise a gear shim. The gearbox section may further comprise a bearing retainer.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments can be realized and that logical and mechanical changes can be made without departing from the spirit and scope of the inventions. Thus, the detailed description herein is presented for purposes of illustration only and not for limitation. For example, any reference to singular includes plural embodiments, and any reference to more than one component or step can include a singular embodiment or step. Also, any reference to attached, fixed, connected or the like can include permanent, removable, temporary, partial, full and/or any other possible attachment option.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion.

Figure 1:
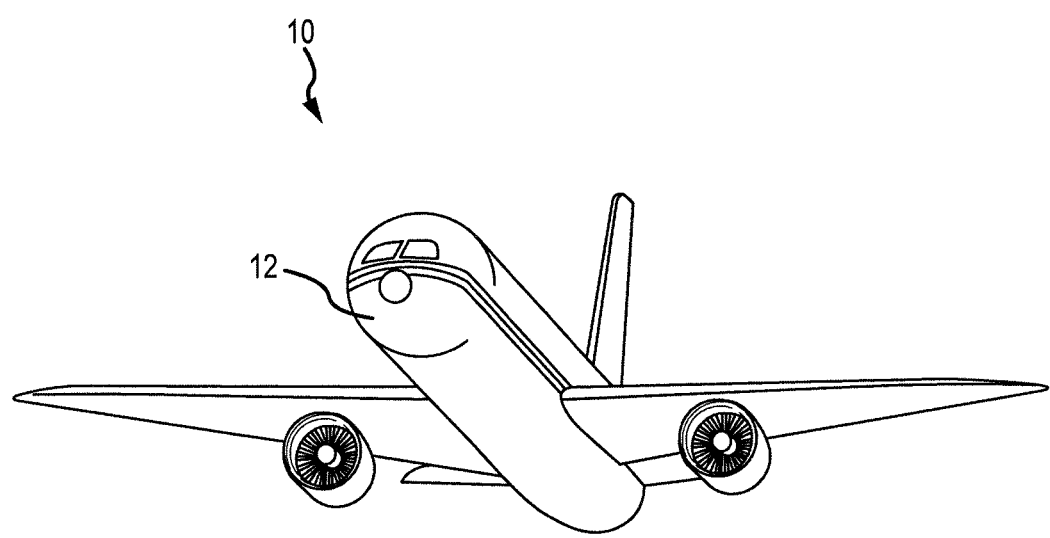
FIG. 1 illustrates a perspective view of an aircraft, in accordance with various embodiments.

In various embodiments and with reference to FIG. 1, an aircraft 10 can comprise a nose 12. A ram air turbine 100 can be located within nose 12 of aircraft 10, and when needed, ram air turbine 100 can be lowered out of nose 12 and into the path of airflow.

Figure 2A:
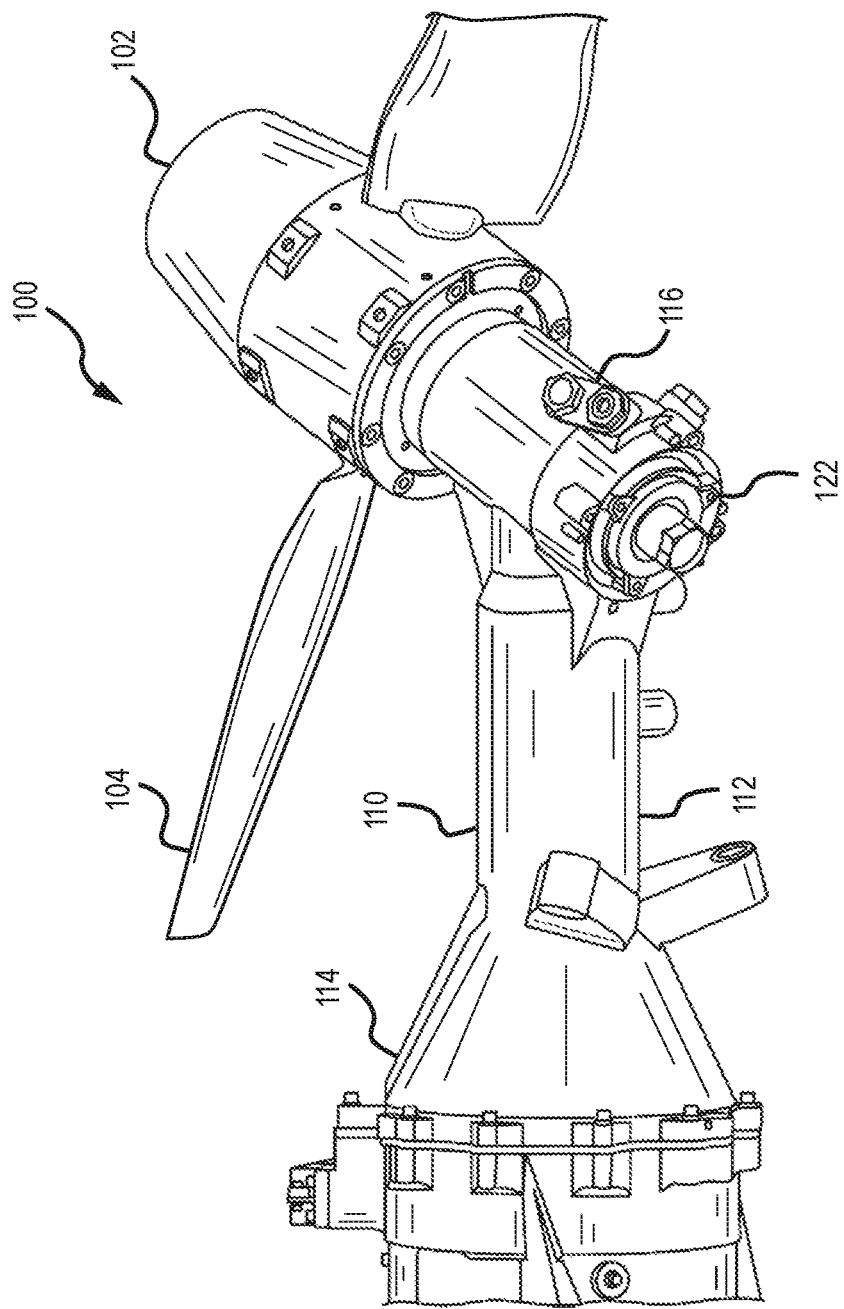
FIGS. 2A-2B illustrate a perspective view, a cross sectional view, and another perspective view of a ram air turbine of an aircraft, in accordance with various embodiments.
Figure 2B:
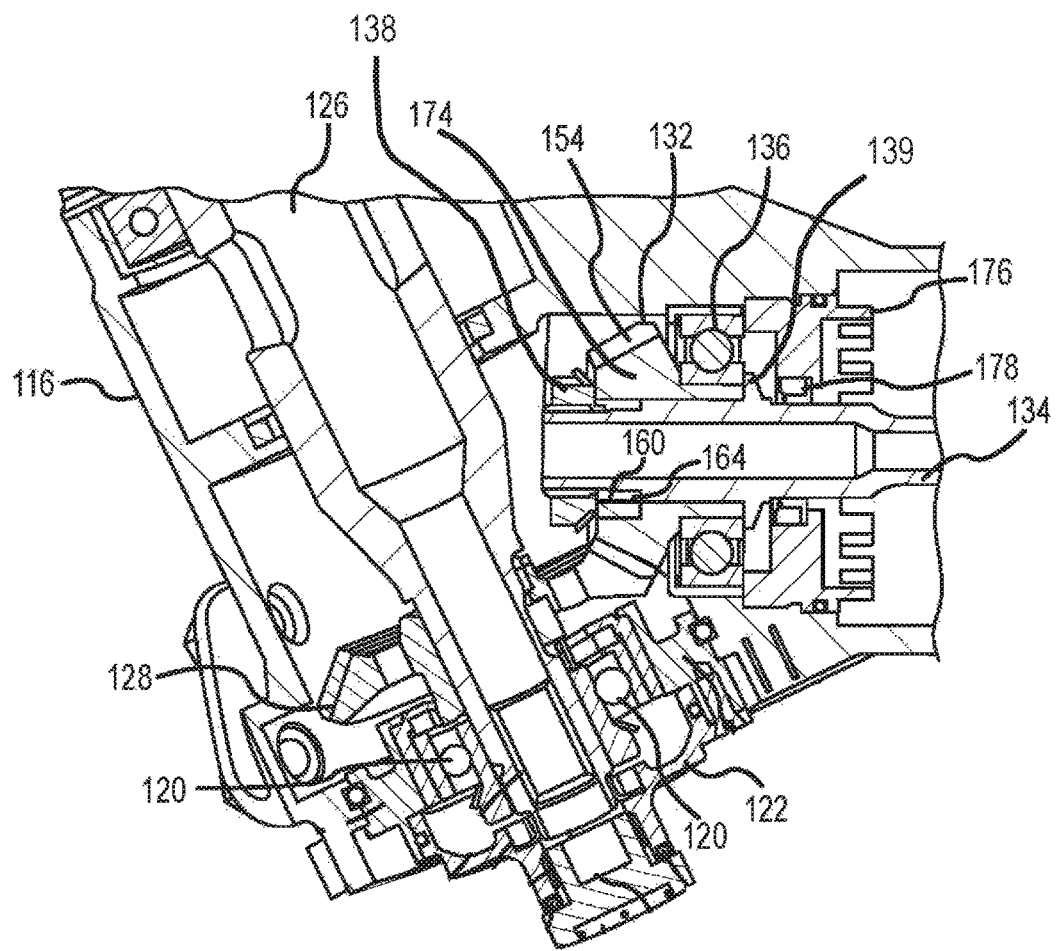

With reference to FIGS. 2A and 2B, ram air turbine 100 can comprise, for example a turbine 102 having one or more blades 104. In various embodiments, turbine 102 is removably coupled to a strut 110. For example, strut 110 can be bolted to the rear of turbine 102.

In various embodiments, strut 110 may comprise a gearbox section 116, a drive section 112, and a generator adapter section 114. Strut 110 may be a one-piece strut, comprising gearbox section 116, drive section 112, and generator adapter section 114 that are all integral to each other. For example, strut 110 may be machined from a single piece of metal, such as aluminum. In various embodiments, turbine 102 can be removably coupled to gearbox section 116 of strut 110.

Strut 110 may comprise a transition between drive section 112 and generator adapter section 114. For example, drive section 112 may have a reduced diameter in relation to generator adapter section 114, such that strut 110 comprises a cone-shaped transition region between drive section 112 and generator adapter section 114. As will be further discussed, in various embodiments, the various components of the ram air turbine that transfer rotation of turbine 102 to a power conversion device, e.g., a generator, are located within gearbox section 116, drive section 112, and generator adapter section 114. As will be further described, many of these components may reside in one or more section of strut 110.

In various embodiments, gearbox section 116 comprises a turbine shaft 126 and a bevel gear 128. Turbine shaft 126 may, for example, be removably coupled to turbine 102, allowing turbine shaft 126 to rotate with the rotation of turbine blades 104.

Bevel gear 128 may be removably coupled to turbine shaft 126. For example, bevel gear 128 may be removably coupled to turbine shaft 126 by a spanner nut, a splined connection, or any other manner of coupling. Bevel gear 128 may be oriented perpendicularly to turbine shaft 126. In various embodiments, bevel gear 128 may comprise a beveled profile configured to interface with another gear and transmit rotation of turbine shaft 126 in a different direction. For example, as will be further discussed, bevel gear 128 can interface with a pinion gear to direct the rotational force of turbine 102 to a power conversion device, e.g., a generator.

In various embodiments, an opposing end of turbine shaft 126 may be seated in a bearing 120. A cover 122 may, for example, be located at an opposite end of gearbox section 116 from turbine 102, and provide a seal for gearbox section 116 against outside contaminants. Further, in various embodiments, gearbox section 116, also referred to as a gearbox section, comprises lubricating fluid, and cover 122 may retain such fluid within gearbox section 116. Cover 122 may, for example, be secured to gearbox section 116 of strut 110 by one or more fasteners such as screws or bolts.

Figure 3:
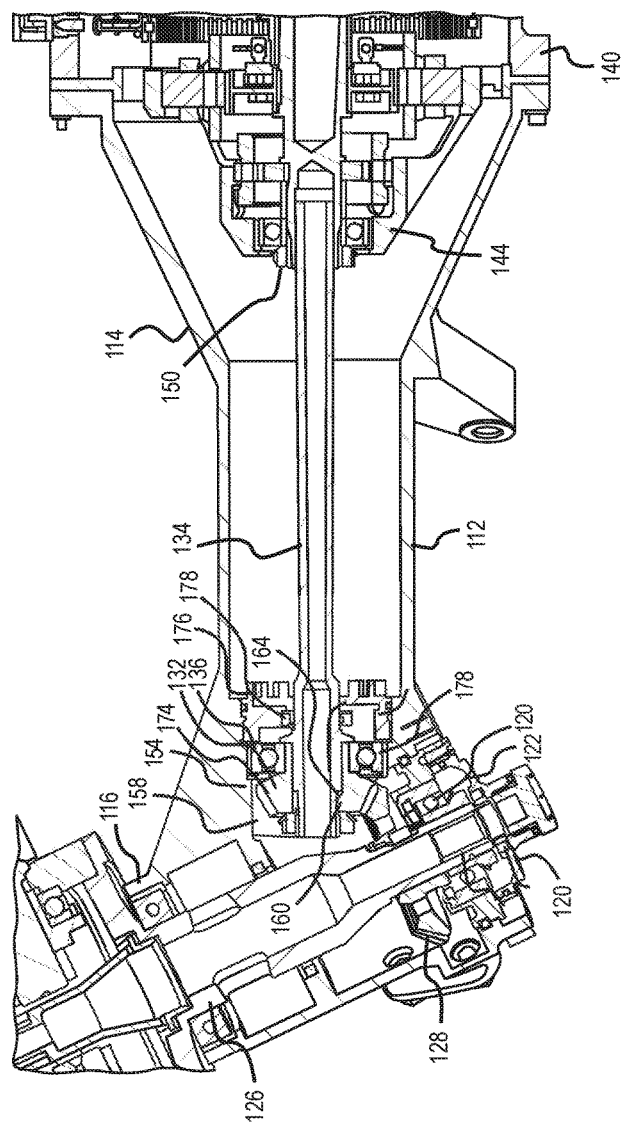
FIG. 3 illustrates a cross sectional view of a ram air turbine of an aircraft, in accordance with various embodiments.

With reference to FIG. 3, in various embodiments, drive section 112 of strut 110 may comprise a driveshaft 134. Driveshaft 134 may traverse drive section 112 and transfer rotation of turbine shaft 126 to power conversion device 140. In various embodiments, driveshaft 134 comprises stainless steel.

In various embodiments, gearbox section 116 comprises a pinion gear 132. Pinion gear 132 may comprise, for example, an uncoated metal, such as stainless steel, for example 300M or 9310 steels. Because pinion gear 132 is not exposed to the atmosphere, it is unnecessary to coat the material of pinion gear 132 as is required by previous designs. In various embodiments, not coating the material of pinion gear 132 may save time and money. With reference to FIG. 3, in various embodiments, pinion gear 132 may comprise a gear body 174 and a gear face 154. Gear face 154 may comprise, for example, a gear tooth pattern that is complimentary to the pattern of bevel gear 128. In various embodiments, pinion gear 132 engages with bevel gear 128 to transfer rotation of turbine shaft 126 to driveshaft 134.

Pinion gear 132 may, for example, be secured to driveshaft 134 by a spanner nut 138, with brief reference to FIG. 2B. In such embodiments, the spanner nut 138 may secure and clamp pinion gear 132 against a shoulder 139 located on driveshaft 134, which may improve alignment of the pinion gear 132 with other components. With reference to FIG. 2B, in various embodiments, pinion gear 132 may comprise a key 160 configured to interact with a keyed joint 164 of driveshaft 134. In such embodiments, key 160 and keyed joint 164 may maintain the position of pinion gear 132 such that pinion gear 132 does not rotate independently of driveshaft 134. In further embodiments, pinion gear 132 may be secured to driveshaft 134 by an interference fit or a close tolerance fit. However, any manner of securing pinion gear 132 to driveshaft 134 is within the scope of the present disclosure.

In various embodiments, driveshaft 134 further comprises a pinion bearing 136. Pinion bearing 136 may be coupled to pinion gear 132 and facilitate rotation and positioning of pinion bearing 136 within drive section 112 of strut 110. For example, pinion bearing 136 may be pressed into gear body 174 to reduce gear misalignment. In various embodiments, the configuration of pinion gear 132, pinion bearing 136, and driveshaft 134 may eliminate the need for the typical second pinion bearing within gearbox section 116. However, any manner of coupling pinion gear 132 and pinion bearing 136 is within the scope of the present disclosure.

Pinion gear 132 may further comprise, for example, a pinion retainer 176. In various embodiments, pinion retainer 176 may comprise an outer diameter slightly larger than the outer diameter of pinion gear 132. For example, pinion retainer 176 may maintain a desired position of pinion bearing 136 in a direction parallel to driveshaft 134. Pinion gear 132 may, for example, fix pinion bearing 136 in a desired axial position. In various embodiments, pinion retainer 176 engages with strut housing 114 by a threaded engagement. In such embodiments, the need for additional shims may be reduced or eliminated.

Pinion retainer 176 may also comprise an upper seal 178. In various embodiments, upper seal 178 is located on driveshaft 134. Upper seal 178 may, for example, prevent lubricating fluid transferring from gearbox section 116 to drive section 112 of strut 110. Upper seal 178 can comprise a dynamic seal which prevents leakage as driveshaft 134 and pinion gear 132 rotate. Any suitable seal type and configuration is within the scope of the present disclosure.

Driveshaft 134 may comprise, for example, a hollow shaft with an inner diameter and outer diameter. In various embodiments, the inner and outer diameters, and therefore the thickness of driveshaft 134, are selected to produce desired operational characteristics of the driveshaft. For example, the inner and outer diameters of driveshaft 134 may be selected to provide a natural bending frequency of driveshaft 134 that is greater than the operating range frequencies of turbine 102. In various embodiments, turbine 102, turbine shaft 126, and driveshaft 134 operate in conjunction as a drivetrain. The inner and outer diameters of driveshaft 134 may be selected, for example, to provide a drivetrain torsional natural frequency that is different from the normal operating range of the turbine. Typically, the normal operating range is one revolution per revolution of the turbine. It may be desirable for the drivetrain avoid resonance at the same range as the normal operating range of the turbine. For example, if the turbine operates at a range of 4,000 to 6,000 revolutions per minute, it may be desirable to tune the drivetrain such that the drivetrain torsional natural frequency is lower than 4,000 revolutions per minute or higher than 6,000 revolutions per minute. Further, in various embodiments, the inner and outer diameters of driveshaft 134 may be selected to both provide a sufficiently high natural bending frequency and a sufficiently low drivetrain torsional natural frequency simultaneously. In other embodiments, driveshaft 134 may comprise a solid shaft.

Figure 4:
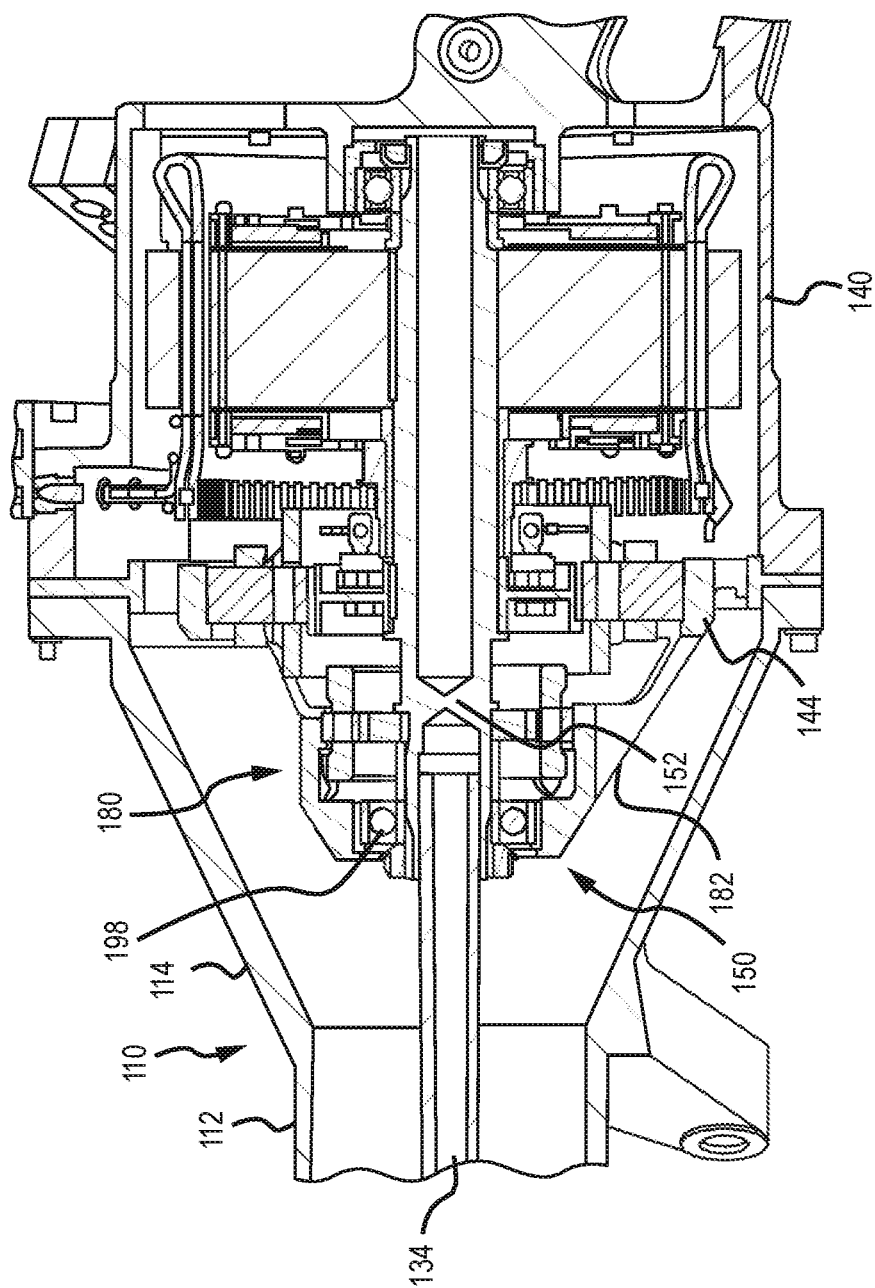
FIG. 4 illustrates a cross sectional view of a ram air turbine of an aircraft, in accordance with various embodiments.

With reference to FIG. 4, in various embodiments, generator 140 may comprise, for example, a turbine end 180. In various embodiments, turbine end 180 is oriented towards driveshaft 134. In various embodiments, generator 140 comprises a generator cover 144. Generator cover 144 may comprise, for example, a cone 182 oriented towards drive section 112 and positioned in a transition region between drive section 112 and generator adapter section 114.

Cone 182 of generator cover 144 can also comprise a generator bearing assembly 150. In various embodiments, an end of driveshaft 134 engages with generator bearing assembly 150. In such embodiments, generator bearing assembly 150 provides support to and/or maintains the position of an end of driveshaft 134.

Generator bearing assembly 150 may comprise, for example a driveshaft pilot diameter within shaft 152 and a generator pilot diameter within strut 110. For example, the driveshaft pilot diameter of generator bearing 198 can comprise an outer diameter of driveshaft 134, such that an end of driveshaft 134 is fit into the driveshaft pilot diameter of generator bearing assembly 150. Appropriate fits and clearances may be chosen to minimize radial movement of driveshaft 134, which may assist in properly aligning pinion gear 132 and/or eliminating the need for an additional bearing. In various embodiments, generator bearing assembly 150 may be held in position by a spanner nut. Any manner of maintaining proper positioning of generator cover 144 and generator bearing 198 is within the scope of the present disclosure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections can be present in a practical system. However, the benefits, advantages, solutions to problems, and any elements that can cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone can be present in an embodiment, B alone can be present in an embodiment, C alone can be present in an embodiment, or that any combination of the elements A, B and C can be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A ram air turbine comprising:
   a turbine comprising a blade and a turbine shaft;
   a one-piece strut removably coupled to the turbine, wherein the one-piece strut comprises a gearbox section, a drive section, and a generator adapter section;
   the turbine shaft comprising a bevel gear oriented perpendicularly to the turbine shaft and positioned within the gearbox section of the one-piece strut;
   a driveshaft positioned within the drive section of the one-piece strut, wherein the driveshaft comprises a first end and a second end, the driveshaft comprising a keyed joint at the first end, and the driveshaft is removably coupled to a generator at the second end, wherein the first end extends into the gearbox section and the second end extends into the generator adaptor section;
   a pinion gear that engages with the bevel gear and is removably secured to the driveshaft by an interference fit, wherein the pinion gear includes a key configured to interact with the keyed joint of the driveshaft to maintain a position of pinion gear relative to the driveshaft;
   a spanner nut coupled to the driveshaft and compressing the pinion gear against a shoulder on the driveshaft; and
   a pinion bearing coupled to and surrounding the pinion gear,
   wherein the driveshaft is supported at the first end by the pinion bearing and is supported at the second end by a generator bearing assembly located within the generator adapter section.

2. The ram air turbine of claim 1, wherein the pinion bearing is press fit onto the pinion gear.

3. The ram air turbine of claim 1, wherein the driveshaft comprises stainless steel.

4. The ram air turbine of claim 1, wherein the pinion gear comprises an uncoated metal material.

5. The ram air turbine of claim 1, further comprising a pinion bearing retainer having a seal, wherein the pinion bearing retainer maintains a position of the pinion bearing in a direction parallel to the driveshaft.

6. The ram air turbine of claim 5, wherein the pinion bearing retainer is engaged with the strut assembly by a threaded engagement.

7. The ram air turbine of claim 1, further comprising a cover configured to seal an end of the gearbox section opposite to the turbine.

8. A ram air turbine comprising:
a turbine comprising a blade;
a one-piece strut removably coupled to the turbine, wherein the one-piece strut comprises a gearbox section and a drive section;
a turbine shaft comprising a bevel gear oriented perpendicularly to the turbine shaft and positioned within the gearbox section of the one-piece strut;
a driveshaft positioned within the drive section and comprising a first end and a second end;
a pinion gear that engages with the bevel gear, wherein the pinion gear is coupled to the first end of the driveshaft; and
a generator having a bearing and a generator shaft, wherein the second end of the driveshaft is received into an end of the generator shaft, the second end comprising a spline that is complimentary to the end of the generator shaft.

9. The ram air turbine of claim 8, wherein a shaft bending frequency of the driveshaft is greater than an operating range frequency of the turbine.

10. The ram air turbine of claim 8, wherein a drivetrain comprises the turbine, the turbine shaft, the driveshaft, and the generator, and wherein a frequency of rotation of the drivetrain is greater than one revolution per revolution of the turbine.

11. The ram air turbine of claim 10, wherein the driveshaft is hollow.

12. The ram air turbine of claim 11, wherein an inner diameter of the driveshaft and an outer diameter of a driveshaft are chosen such that a torsional natural frequency of the drivetrain is less than one per revolution of the turbine.

13. The ram air turbine of claim 8, wherein the driveshaft is solid.

14. The ram air turbine of claim 8, wherein the gearbox section further comprises a pinion bearing retainer.

15. The ram air turbine of claim 8, further comprising a cover configured to seal an end of the gearbox section opposite to the turbine.

* * * * *